May 30, 1933.  C. DESOUTTER  1,911,440
ARTIFICIAL LIMB
Filed Dec. 20, 1929
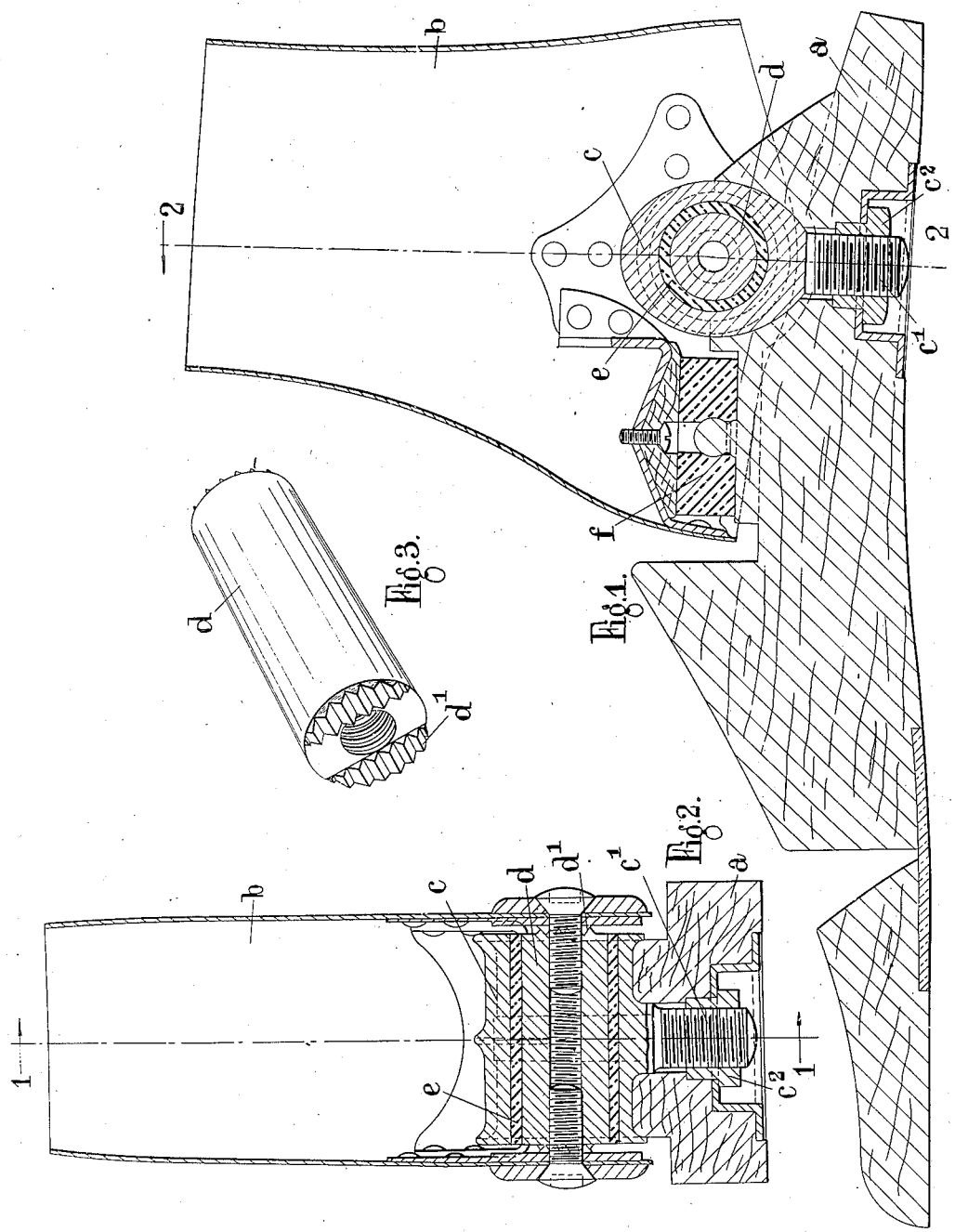
C. Desoutter
INVENTOR
By: Marks & Clerk Patented May 30, 1933

1,911,440

UNITED STATES PATENT OFFICE

CHARLES DESOUTTER, OF LONDON, ENGLAND, ASSIGNOR TO DESOUTTER BROTHERS LIMITED, OF LONDON, ENGLAND

ARTIFICIAL LIMB

Application filed December 20, 1929, Serial No. 415,584, and in Great Britain December 22, 1928.

This invention relates to artificial limbs of the kind in which an angular movement takes place about a desired axis and has particular reference to ankle joints, but is applicable to other joints also.

Heretofore it has been found necessary to provide resilient buffers, springs or the like not only for the purpose of absorbing shocks and limiting the extent of movement of the parts but also to ensure that, for example, the foot of an artificial leg is normally held at the correct angle. Furthermore, such joints have hitherto always consisted of a hinge having two adjacent surfaces capable of sliding over each other, and it has therefore been necessary to provide for the lubrication of the joint.

This invention does away with the necessity of providing buffers or springs for the purpose of restoring the joint to the normal position (and which are a constant source of trouble due to buckling and fatigue) and of providing any means of lubrication.

According to this invention the artificial limb is provided with a joint which consists of a central pin attached to one part of the limb and a surrounding sleeve attached to another part of the limb relative to which the first part is required to be articulated. Between the said pin and the said sleeve is interposed a rubber bush which is tightly gripped between the two, and may be cemented to either or both if required. The said rubber bush is so tightly held conveniently by compression of the rubber that no relative movement is possible between either the exterior surface thereof and the interior surface of the sleeve, or between the interior surface thereof and the exterior surface of the pin. Relative movement is nevertheless possible between the pin and the sleeve since the rubber bush is capable of deformation and accordingly permits the pin to be rotated relative to the sleeve through a sufficient angle for the purposes of the joint.

The accompanying drawing illustrates one convenient mode of carrying out the invention.

Figure 1 is a longitudinal sectional elevation of a part of an artificial foot constructed in accordance with the invention.

Figure 2 is a section on the line 2—2 of Figure 1, and

Figure 3 is a perspective view of a detail.

In carrying the invention into effect in the manner illustrated the parts $a$ and $b$ of the foot are united by an ankle joint which comprises a sleeve $c$ fixed to the part $a$ (for example by the threaded shank $c'$ and nut $c^2$), a central pin $d$ fixed to the part $b$ (for example by the interengagement of teeth $d'$ on its ends and teeth on the part $b$), and a rubber sleeve $e$ compressed between the pin and sleeve and if necessary cemented to either or both parts. Relative movement between the parts $a$ and $b$ is permitted by the elasticity of the rubber sleeve $e$, but if necessary a forward buffer $f$ may be provided.

As soon as relative movement takes place between the two parts $a$ and $b$ of the limb to which the said sleeve and pin are attached, the rubber bush is put under strain and tends to exert a restoring force, with the result that when external constraint is removed, the joint is at once restored to the normal position.

Unlike joints which depend for this restoration to the normal position on external buffers or springs, which are likely to wear unequally, or vary in their effect after prolonged use the joint with which this invention is concerned will always restore to the same position. Further, this joint requires no lubrication since there are no contacting surfaces moving relative to one another. Further the rubber bush causes the joint to have important shock absorbing qualities and no wear whatever takes place.

In one practical example of a joint constructed according to the invention, the outside diameter of the inner central pin member is .71", the internal diameter of the outer sleeve member .9375", and the length of the joint 1.75", while the dimensions of the rubber bush before being interposed to be tightly gripped between the pin and the sleeve are: outside diameter 1.125"; bore .5" diameter; and length .75".

In another practical form of the joint the above dimensions all remain the same with the exception of the exterior diameter of the inner pin member, which in the second example is .7725".

I claim,

1. An artificial limb comprising limb members, a two-part pivotal connection between the limb members, and an elastic mass facially bonded with the respective parts of the pivotal connection and having a sufficient degree of elasticity to restore the limb members to normal position following displacement of the latter.

2. An artificial limb comprising limb members, a two-part pivotal connection between the limb members, and an elastic mass facially bonded with the respective parts of the pivotal connection and having a sufficient degree of elasticity to restore the limb members to normal position following displacement of the latter, said elastic mass being of tubular form.

3. An artificial limb comprising limb members, a joint connecting said members and including a central pin attached to one limb member and a surrounding sleeve attached to the other limb member permitting relative pivotal movement of the two limb members, and an elastic mass constituting a bush interposed between the pin and sleeve and having a sufficient degree of elasticity to restore the limb members to normal position following relative displacement of the latter.

4. An artificial limb comprising limb members, a joint connecting said members and including a central pin attached to one limb member and a surrounding sleeve attached to the other limb member permitting relative pivotal movement of the two limb members, and an elastic mass constituting a bush interposed between the pin and sleeve and having a sufficient degree of elasticity to restore the limb members to normal position following relative displacement of the latter, said bush being cemented to the pin and sleeve to prevent relative surface displacement.

5. An artificial limb comprising limb members, a joint connecting said members and including a central pin, one of said limb members being terminally bifurcated and firmly embracing said pin, a surrounding sleeve and a laterally projecting anchoring member firmly secured to the other limb member and receiving the pin to permit relative pivotal movement of the limb members, and an elastic mass constituting a bush interposed between the pin and sleeve and having a sufficient degree of elasticity to restore the limb members to normal position following relative displacement of the latter and normally acting to maintain the limb members in predetermined position, said bush being cemented to the pin and sleeve to prevent relative surface displacement.

In testimony whereof I have signed my name to this specification.

CHARLES DESOUTTER.